CALVIN ADAMS, OF PITTSBURG, PENNSYLVANIA.

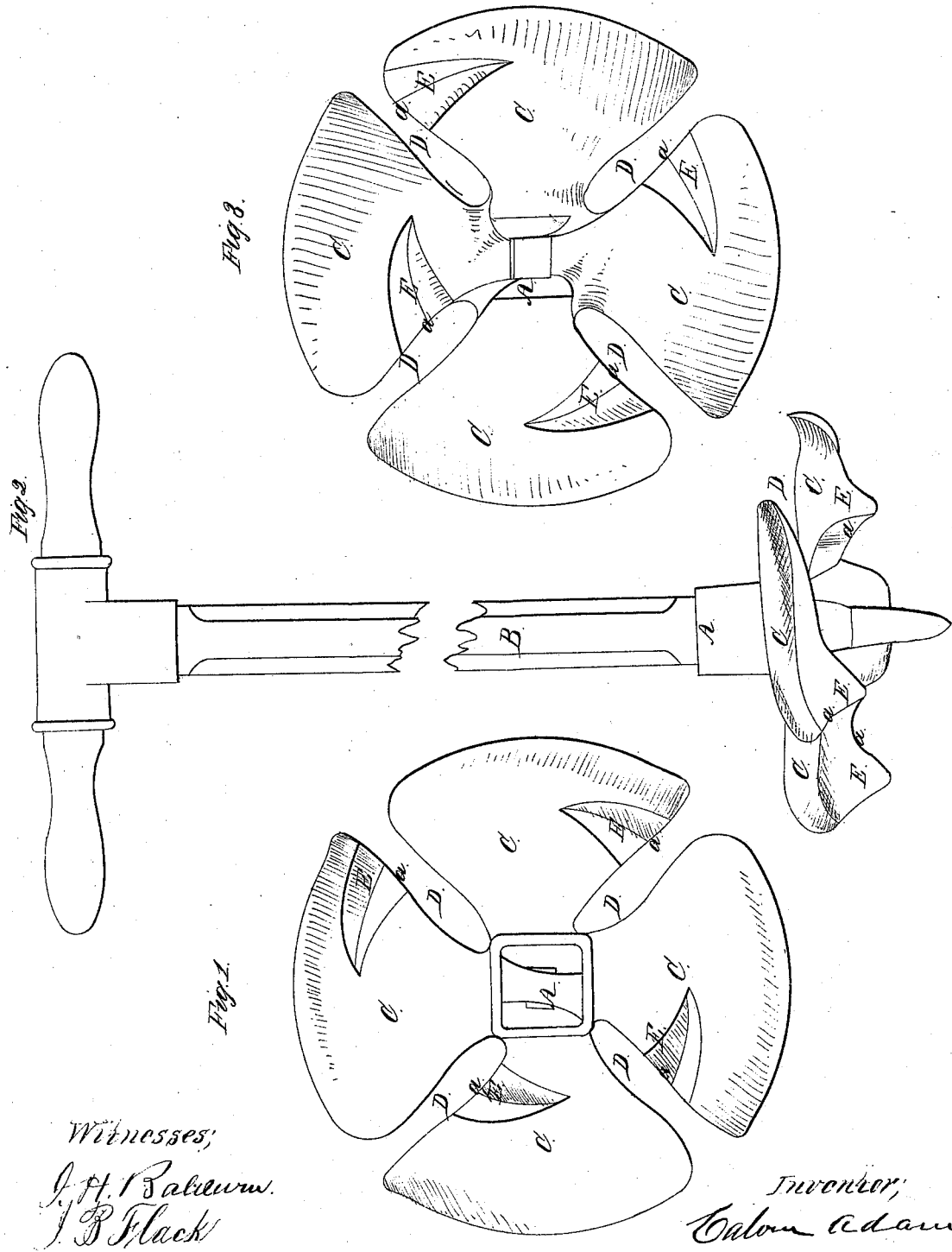

Letters Patent No. 83,233, dated October 20, 1868.

IMPROVED POST-AUGER.

The Schedule referred to in these Letters Patent and making part of the same.

*To all whom it may concern:*

Be it known that I, CALVIN ADAMS, of the city of Pittsburg, in the county of Allegheny, and State of Pennsylvania, have invented a new and improved Post-Auger, an implement for boring or digging holes in the earth, to set posts in; and I do hereby declare the following to be a full, clear, and exact description thereof, reference being had to the accompanying drawings, making part of this specification.

This post-auger may be made of cast or wrought-iron, sheet-iron, or steel, or a combination of these materials; but I generally make them of cast-iron, and will particularly describe my method of so constructing them. The drawings show an auger made with an opening or recess, A, in the centre, in which the wooden handle, B, is to be inserted and fixed. They may be made, however, with iron handles constructed either as a part of or to be attached to the auger. The disk or boring-surface of the auger I form in one or more parts, which may properly be called blades or arms, C, C C C, with open spaces of about an inch each between each arm, D D D D, for the earth to pass through. The arms C C are pitched forward, or set at an angle sufficient to take up the earth as it is loosened in turning the auger. On the face or front edge, *a a a a*, of these arms, I form one or more v-shaped plows, E E E E, for the purpose of tearing and loosening the ground more easily and rapidly than could be done by the plain edge of the arm, and thereby reducing the labor of boring.

It will be seen by the drawings that I have placed one of these plows on each of the four arms therein shown, and at different distances from the centre, A of the auger, so that each plow makes its own furrow, and all the surface underneath the arms is thus loosened and taken up on the arms at every revolution of the auger. I generally make these plows, E E E E, like the other parts of the auger, of cast-iron, and the auger thus made is cast in one entire piece, with or without a handle; but the manufacturer may, if it is preferred, make the plows of steel, and rivet or otherwise fasten them on to the arms. These augers may, of course, be made with less or more arms, and fewer or more plows than I have described. I make these augers about eight inches in diameter, and the plows a half an inch or more in depth at the edge *a*, sloping from thence up, so as to carry the earth easily on to the arms C C.

Having thus described the nature and use of my invention,

What I claim as new, and desire to secure by Letters Patent, is—

A post-auger, with one or more plows, constructed and arranged on the arms, and operating substantially as and for the purpose shown and described.

CALVIN ADAMS.

Witnesses:
J. H. BALDWIN,
J. B. FLACK.